United States Patent
Wels et al.

(10) Patent No.: US 8,280,133 B2
(45) Date of Patent: Oct. 2, 2012

(54) METHOD AND SYSTEM FOR BRAIN TUMOR SEGMENTATION IN 3D MAGNETIC RESONANCE IMAGES

(75) Inventors: Michael Wels, Bamberg (DE); Gustavo Henrique Monteiro de Barros Carneiro, Lisbon (PT); Martin Huber, Uttenreuth (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 641 days.

(21) Appl. No.: 12/506,674

(22) Filed: Jul. 21, 2009

(65) Prior Publication Data

US 2010/0027865 A1 Feb. 4, 2010

Related U.S. Application Data

(60) Provisional application No. 61/085,507, filed on Aug. 1, 2008.

(51) Int. Cl.
*G06K 9/00* (2006.01)

(52) U.S. Cl. ........ 382/128; 382/190; 382/194; 382/224; 382/228

(58) Field of Classification Search .................. None
See application file for complete search history.

(56) References Cited

U.S. PATENT DOCUMENTS

| | | | |
|---|---|---|---|
| 5,887,588 A | 3/1999 | Usenius et al. | |
| 2006/0239920 A1 | 10/2006 | Kucharczyk et al. | |
| 2008/0051649 A1 | 2/2008 | O'Dell et al. | |
| 2010/0260396 A1* | 10/2010 | Brandt et al. ............ | 382/131 |

OTHER PUBLICATIONS

Boykov, Y. et al, "Graph Cuts and Efficent N D Image Segmentation", Int J. Com put. Vision 70(2) (2006) 109-131.*
Smith, S.M., "Fast Robust Automated Brain Extraction", Hum. Brain Mapp. 17(3) (2002) 143 155.*
Viola, P. et al, "Robust Real-Time Object Detection", In: 2nd International Workshop on Statistical Learning and Computational Theories of Vision, Vancouver, Canada (Jul. 2001) 1-25.*
Cobzas, Dana; Birkbeck, Neil; Schmidt, Mark; Jagersand, Martin; Murtha, Albert; , "3D Variational Brain Tumor Segmentation using a High Dimensional Feature Set," Computer Vision, 2007. ICCV 2007. IEEE 11th International Conference on , vol., No., pp. 1-8, Oct. 14-21, 2007 doi: 10.1109/ICCV.2007.4409130.*
Corso, J.J., Yuille, A., Sicotte, N.L., Toga, A.: Detection and segmentation of pathological structures by the extended graph-shifts algorithm. In: Int. Conf. Med. Image Comput. and Comp.-Assist. Interv., Brisbane, Australia, Oct. 2007, pp. 985-993 (2007).*
Carneiro, G., Georgescu, B., Good, S., Comaniciu, D.: Automatic fetal measurements in ultrasound using constrained probabilistic boosting tree. In: Int. Conf. Med. Image Comput. and Comp.-Assist. Interv., Brisbane, Australia (Oct. 2007).*
Boykov, Y. et al. "An Experimental Comparison of Min-Cut/Max-Flow Algorithms for Energy Minimization in Vision", IEEE T. Pattern Anal. 26(9) (Sep. 2004) 1124-1137.
Boykov, Y. et al., "Graph Cuts and Efficent N-D Image Segmentation", Int. J. Comput. Vision 70(2) (2006) 109-131.

(Continued)

*Primary Examiner* — Vu Le
*Assistant Examiner* — Thomas A James (57) ABSTRACT

A method and system for brain tumor segmentation in multi-spectral 3D MRI images is disclosed. A trained probabilistic boosting tree (PBT) classifier is used to determine, for each voxel in a multi-spectral 3D MR image sequence, a probability that the voxel is part of a brain tumor. The brain tumor is then segmented in the multi-spectral 3D MRI image sequence using graph cuts segmentation based on the probabilities determined using the trained PBT classifier and intensities of the voxels in the multi-spectral 3D MR image sequence.

23 Claims, 4 Drawing Sheets

OTHER PUBLICATIONS

Smith, S.M., "Fast Robust Automated Brain Extraction", Hum. Brain Mapp. 17(3) (2002) 143-155.

Cox, I.J. et al., "Dynamic Histogram Warping of Image Pairs for Constant Image Brightness", In IEEE Int. Conf. on Image Proc., vol. II, Washington D.C., USA. (Oct. 1995) 366-369.

Viola, P. et al., "Robust Real-Time Object Detection", In: 2nd International Workshop on Statistical Learning and Computational Theories of Vision, Vancouver, Canada (Jul. 2001) 1-25.

Lienhart, et al., "Empirical Analysis of Detection Cascades of Boosted Classifiers for Rapid Object Detection", In Michaelis B. Krell G., eds.: DAGM Symposium, vol. 2781 of Lect. Notes in Comp. Sci., Springer (Sep. 2003) 297-304.

Tu, Z., et al., "A Learning Based Approach for 3D Segmentation and Colon Detagging", In: Europ. Conf. Comp. Vis., Graz, Austria (May 2006) 436-448.

* cited by examiner

METHOD AND SYSTEM FOR BRAIN TUMOR SEGMENTATION IN 3D MAGNETIC RESONANCE IMAGES

This application claims the benefit of U.S. Provisional Application No. 61/085,507, filed Aug. 1, 2008, the disclosure of which is herein incorporated by reference.

BACKGROUND OF THE INVENTION

The present invention relates to medical imaging of the brain, and more particularly, to fully automatic segmentation of brain tumors in multi-spectral 3D magnetic resonance images.

Detection and delineation of pathology, such as cancerous tissue, in multi-spectral brain magnetic resonance (MR) volume sequences is an important problem in medical imaging analysis. For example, precise and reliable segmentation of brain tumors is critical in order to automatically extract diagnostically relevant quantitative findings regarding the brain tumors, such as the volume of a tumor or its relative location. Once these findings are obtained, they can be used for guiding computer-aided diagnosis and therapy planning, as well as for traditional decision making, such as decisions regarding surgery. However, the manual labeling of MR volumetric data is time consuming, which can lead to potential delays in the clinical workflow. Furthermore, manual annotations may vary significantly among experts as a result of individual experience and interpretation. Accordingly, a method for fully automatically segmenting brain tumors in MR volumes without user interaction is desirable.

Further, in 3D MR images of pediatric brains, significant variation of shape and appearance can be caused not only by pathology (tumors), but also by non-pathological "background", which is caused by ongoing myelination of white matter during maturation of the brain. This results in heterogeneous shapes and appearance of pediatric brain tumors in different patients. Thus, the segmentation of pediatric brain tumors is more complicated than the segmentation of brain tumors in adult patients. Accordingly, a brain tumor segmentation that is robust enough to accurately handle the segmentation of pediatric brain tumors is desirable.

BRIEF SUMMARY OF THE INVENTION

The present invention provides a method and system for segmenting brain tumors in multi-spectral 3D MR images. Embodiments of the present invention provide automatic brain tumor segmentation that is capable of dealing with the characteristic artifacts of 3D MR images, such as Rician noise, partial volume effects, and intra-/inter-scan intensity inhomogeneities. Further embodiments of the present invention are robust enough to handle the heterogeneous shape and appearance of pediatric brain tumors in different patients.

Embodiments of the present invention utilize a discriminative statistical model of the brain pathology appearance as a constraint for a subsequent optimization. The statistical model can be provided by a machine learning technique that can utilize high-dimensional feature vectors to encode characteristic voxel contexts. The optimization can be a search for maximum a posteriori (MAP) estimate of the most likely binary image segmentation, which permits efficient computation of a solution using a max-flow/min-cut optimization procedure and is optimal in terms of Bayseian classification theory.

In one embodiment of the present invention, a trained probabilistic boosting tree (PBT) classifier is used to determine, for each voxel in a multi-spectral 3D MR image sequence, a probability that the voxel is a brain tumor. The brain tumor is then segmented in the multi-spectral 3D MRI image sequence using graph cuts segmentation based on the probabilities determined using the trained PBT classifier and intensities of the voxels in the multi-spectral 3D MR image sequence.

These and other advantages of the invention will be apparent to those of ordinary skill in the art by reference to the following detailed description and the accompanying drawings.

DETAILED DESCRIPTION

The present invention is directed to a method and system for automatic brain tumor segmentation in 3D magnetic resonance (MR) images. Embodiments of the present invention are described herein to give a visual understanding of the brain tumor segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
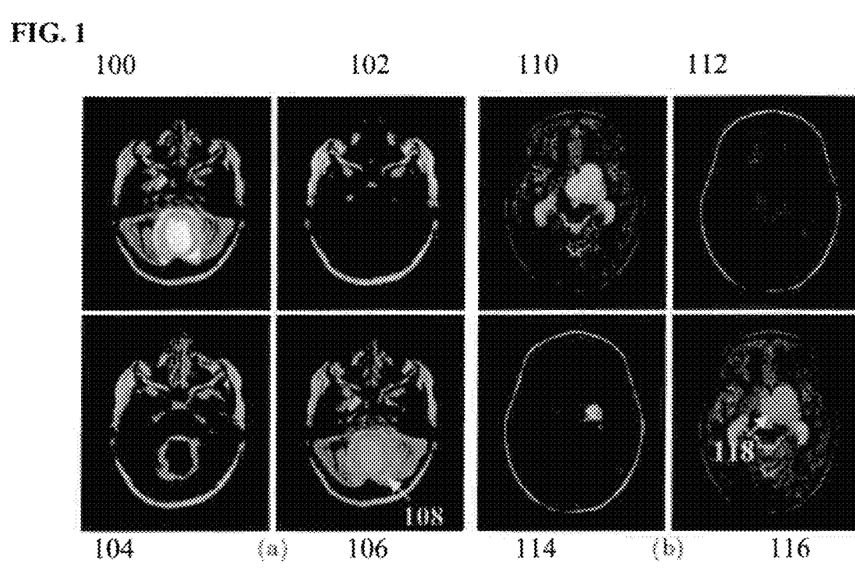
FIG. 1 illustrates exemplary MR images showing pediatric brain tumors.

Embodiments of the present invention are directed to fully automated brain tumor segmentation in multi-spectral 3D MR images. In one embodiment, a multi-spectral 3D image sequence can include a T2 weighted MR volume, a T1 weighted MR volume, and a T1 weighted MR volume after contrast enhancement. FIG. 1 illustrates exemplary MR images showing pediatric brain tumors. As illustrated in (a) of FIG. 1, images 100, 102, and 104 show an axial slice of a multi-spectral 3D MR image sequence. In particular, image 100 shows a T2 weighted image, image 102 shows a T1 weighted image, and image 104 shows a T1 weighted MR image after contrast enhancement. Image 106 shows an annotated ground truth of a pediatric brain tumor 108 overlaid with the T2 weighted image. As illustrated in (b) of FIG. 1, images 110, 112, and 114 show an axial slice of another multi-spectral 3D MR image sequence. In particular, image 110 shows the T2 weighted image, image 112 shows the T1 weighted image, and image 114 shows the T1 weighted MR image after contrast enhancement. Image 116 shows an annotated ground truth of a pediatric brain tumor 118 overlaid with the T2 weighted image.

Embodiments of the present invention provide a top-down segmentation method based on a Markov random field (MRF) that combines a probabilistic boosting tree (PBT) and lower-level segmentation via graph cuts. The PBT provides a strong discriminative observation model that classifies tumor appearance while a spatial prior takes into account the pair-wise homogeneity in terms of classification labels and multi-spectral voxel intensities. The discriminative model relies not only on observed local intensities, but also on surrounding context in the multi-spectral 3D MR images for detecting candidate regions for pathology.

As described above, according to an embodiment of the present invention, a method for segmenting brain tumors utilizes an integrated formulation for combining PBT classification and computation of minimum graph cuts. This segmentation method relies on an integrated formulation of an objective function that is subject to optimization via an efficient graph cuts algorithm. This integrated objective function is derived from the general maximum a posteriori (MAP) framework for image segmentation.

In general, the problem of segmenting an image can be stated as the search for an MAP estimate of the most likely class labels given appropriate prior and observation models in terms of probability density functions. Let $S=\{1, 2, \ldots, N\}$, $N \in \mathbb{N}$, be a set of indices to image voxels. At each index $s \in S$, there are two random variables: $y_s \in Y=\{+1, -1\}$ and $x_s \in X=\mathfrak{R}^M$, $M \in \mathbb{N}$. $y_s$ denotes the unobservable binary segmentation of voxel s into foreground (i.e., the object that is segmented) and background, and $x_s$ represents the observable vector of associated features that are assumed to be causally linked to the underlying class labels $y \in Y$ by a unified observation model defined by a probability density function $p(x|y)$ for $x \in X$. The emergence of the class labels themselves is describes by a prior model $p(y)$. The segmentation task can be stated as the search for a MAP estimate:

$$Y^* = \underset{Y}{\operatorname{argmax}} p(Y \mid X) \tag{1}$$

where $p(Y|X)$ is the joint posterior probability over the image domain S with $Y=(y_s)_{s \in S}$ and $X=(x_s)_{s \in S}$. Using the Bayes rule, and assuming a uniform distribution $p(X)$, the MAP estimate can be expressed as:

$$Y^* = \underset{Y}{\operatorname{argmax}} \ln p(X \mid Y) + \ln p(Y). \tag{2}$$

To concretize this optimization problem, a region specific probability term and an appropriate prior need to be identified. According to an embodiment of the present invention, $p(X|Y)$ is provided by a PBT classifier. The machine learning technique of PBT recursively groups boosted ensembles of weak classifiers to a tree structure during learning from expert annotated training data. Training a PBT resembles inducing a multivariate binary regression tree as the final strong classifier:

$$H(x) = \sum_{t=1}^{T} h_t(x) \tag{3}$$

generated within each inner node for a feature vector x through a combination of real-valued contributions $h_t(x)$ of T $\in \mathbb{N}$ weak classifiers asymptotically approaches the additive logistic regression model:

$$H(x) \approx \frac{1}{2} \ln \frac{p(y=+1 \mid x)}{p(y=-1 \mid x)}. \tag{4}$$

Accordingly, at each inner node v of the resulting PBT there are current approximations of the posterior probability $\tilde{p}_v(y|x)$. During classification, those values are used to guide tree traversing and combined propagation of posteriors in order to get a final approximation $\tilde{p}(y|x)$ of the true posterior probability $p(y|x)$ at the tree's root node.

As described above, assuming X to be distributed uniformly, and also to be independently and identically distributed, we have $p(x|y) \propto p(y|x)$ and therefore, $p(X|Y) \approx \pi_{s \in S} \tilde{p}(y_s|x_s)$ in Equation (2).

The feature vectors x used for PBT classification can include individual multi-spectral intensities, inter-spectrality intensity gradients, and 2D Haar-like features computed on an intra-axial 2D context surrounding a voxel of interest. The 2D Haar-like features can be represented implicitly in memory by so-called (Rotated) Integral Images. This allows for fast re-computation of the features with respect to a given voxel when they are actually assessed. In one exemplary implementation, 2D Haar-like features may be used instead of the full set of 3D Haar features because of their lower computational cost and memory requirements, but the present invention is not limited thereto. It is also possible to use 3D Haar-like features computed on a 3D context surrounding the voxel of interest. 3D Haars are represented by integral volumes and only computed at the central voxel of each context therefore capturing local 3D edge characteristics. In order to capture a discriminative representation of the full context, and not only local edge characteristics at the central 2D voxel, Haar-like feature values are calculated according to given prototypes on every valid origin and scale within the chosen voxel context.

For the prior distribution we assume a Markov random field prior model:

$$p(Y) \propto \exp\left(-U\left(Y \mid \frac{1}{\lambda}\right)\right) \tag{5}$$

formulated, according to the Hammersley-Clifford Theorem, as a Gibbs distribution with the energy function:

$$U\left(Y \mid \frac{1}{\lambda}\right) = \frac{1}{\lambda} \sum_{s \in S} \sum_{t \in N_s} V_{st}(y_s, y_t), \tag{6}$$

where $$\frac{1}{\lambda}$$

with $\lambda \in ]0.0, +\infty[$ controls the relative influence of the spatial prior over the observation model and $N_s$ represents the neighborhood of voxel s. The interaction potentials can be expressed as:

$$V_{st}(y_s, y_t) = \exp\left(-\frac{1}{2}\sum_{l=1}^{L}\frac{(i_{s_l} - i_{t_l})^2}{\sigma_l^2}\right) \cdot \frac{\delta(y_s, y_t)}{\text{dist}(s, t)}, \quad (7)$$

where vectors $(i_{s1}, \ldots, i_{sL})$ and $(i_{t1}, \ldots, i_{tL})$ denote the observed intensities at voxels s and t taken from $L \in N$ aligned input pulse sequences (e.g., T2 weighted, T1 weighted, and T1 weighted after contrast enhancement), and:

$$\delta(y_s, y_t) = \begin{cases} 1 & \text{if } y_s \neq y_t \\ 0 & \text{otherwise.} \end{cases} \quad (8)$$

The function dist(s,t) denotes the physical distance between voxels s and t, which varies when working on image volumes with anisotropic voxel spacing. The model emphasizes homogenous segmentations among neighboring voxels, but weights penalties for heterogeneity according to intensity similarities of the voxels involved.

Figure 2:
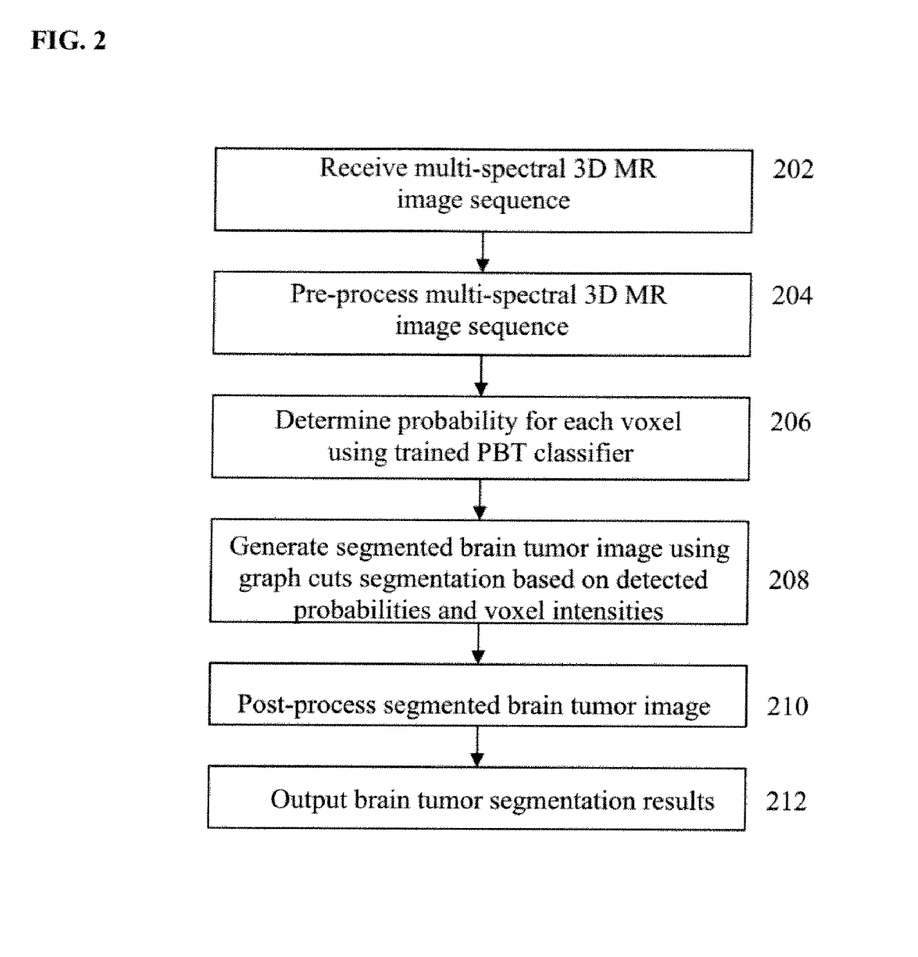
FIG. 2 illustrates a method for brain tumor segmentation in a sequence of multi-spectral 3D MR images according to an embodiment of the present invention.

With the equality:

$$Y^* = \operatorname*{argmax}_{Y}\sum_{s\in S}\ln\tilde{p}(y_s \mid x_s) - \frac{1}{\lambda}\sum_{s\in S}\sum_{t\in N_s}V_{st}(y_s, y_t) = \quad (9)$$

$$\operatorname*{argmin}_{Y}\lambda \cdot \left(\sum_{s\in S}-\ln\tilde{p}(y_s \mid x_s)\right) + \sum_{s\in S}\sum_{t\in N_s}V_{st}(y_s, y_t),$$

the initial maximization problem can be transformed into a minimization problem that is in suitable form for optimization using the well-known graph cuts algorithm. It can be noted that the reciprocal of the regularization parameter in Equation (6) can equivalently be used to weight the influence of the observation model over the prior model. Given Equation (9), setting up the graph and defining the edge capacities for the associated max-flow/min-cut problem instance is straightforward. For example details on setting up and solving such as max-flow/min-cut graph cuts problem are described in Boykov et al., "Graph Cuts and Efficient N-D Image Segmentation", *Int. J. Comput. Vision* 70(2) (2006), pgs. 109-131, which is incorporated herein by reference. However, embodiments of the present invention differ from the graph cuts segmentation described in Boykov et al. in that embodiments of the present invention do not use additional hard constraints to predetermine individual class labels of certain voxels. The graph cuts that optimize equation (9) result in each voxel in the 3D MR image being assigned a label of foreground (e.g., tumor) or background, thus segmenting a brain tumor in the 3D MR image FIG. 2 illustrates a method for brain tumor segmentation in a sequence of multi-spectral 3D MR images according to an embodiment of the present invention. The method of FIG. 2 transforms image data representing a patient's head and brain and transforms the image data to segment a representation of a brain tumor in the image data. At step 202, a sequence of multi-spectral 3D MR images is received. The sequence of multi-spectral MR 3D images is a sequence of 3D MR images acquired at different pulse sequences including a T2 weighted MR volume, a T1 weighted MR volume, and a T1 weighted MR volume after contrast enhancement. Accordingly, each voxel in the multi-spectral MR sequence has three intensity values, one for each of the 3D MR images. The multi-spectral 3D MR sequence can be received from an MRI scanning device, or can be a previously stored sequence of multi-spectral 3D MR images loaded from memory or storage of a computer system, or some other computer readable medium.

At step 204, the sequence of multi-spectral 3D MR images is pre-processed. For example, the sequence of multi-spectral 3D MR images can be pre-processed by performing the following well-known pre-processing techniques: skull stripping to remove skull image data in order to extract the brain in 3D MR images, gradient anisotropic diffusion filtering, and inter-scan intensity standardization. For example, these techniques are described in detail in Smith, "Fast Robust Automated Brain Extraction", Hum. Brain Mapp. 17 (2002), pgs. 143-155, Weickert, "Anisotropic Diffusion in Image Processing", Teubner-Verl., Stuttgart, Germany (1998), and Cox et al., "Dynamic Histogram Warping of Image Pairs for Constant Image Brightness", IEEE Int. Conf. on Image Proc., Vol. 1, Washington, D.C., USA (1995), pgs. 366-369, respectively, all of which are incorporated herein by reference.

At step 206, a trained PBT classifier is used to determine for each voxel in the multi-spectral 3D MR image sequence, the probability that the voxel is a brain tumor. The PBT classifier is trained based on a set of annotated training images. In particular, local features in the neighborhood of positive (brain tumor) and negative training samples are extracted and used to train the PBT classifier. The trained PBT classifier scans the multi-spectral 3D MR image sequence by calculating local features in the neighborhood of each voxel, and determining, based on the local features for a voxel, a probability of the voxel being part of a brain tumor. As described above, the feature vectors used for PBT classification can include individual multi-spectral intensities, inter-spectrality intensity gradients, 2D Haar-like features computed on an intra-axial 2D context surrounding a voxel of interest, and 3D Haar-like features computed on a 3D context surrounding a voxel of interest. These features are described in greater detail by Viola and Jones, "Robust Real-time Object Detection", 2nd International Workshop on Statistical Learning and Computational Theories of Vision, Vancouver, Canada (2001), pgs. 1-25, Lienhart et al., "Empirical Analysis of Detection Cascades of Boosted Classifiers for Rapid Object Detection", DAGM-Symposium (2003) 297-304, and Tu et al., "Probabilistic 3D Polyp Detection in CT Images: The Role of Sample Alignment", IEEE Comp. Soc. Conf. Comp. Vis. and Pat. Recog., New York, USA (2006), pgs. 1544-1551, respectively, all of which are incorporated herein by reference.

At step 208, a segmented brain tumor image is generated using graph cuts segmentation based on the probabilities determined by the PBT classifier and the intensities of the voxels of the multi-spectral 3D MR image sequence. The probability estimates determined by the PBT classifier are used to constrain the computation of minimum cuts based on a Markov random field (MRF) prior model. In particular, an objective function integrates the probabilities determined by the PBT classifier and prior model based on the voxel intensities. The voxel probabilities determined by the PBT classifier provide an observation model that classifies tumor appearance, while a spatial prior takes into account pair-wise homogeneity in classification labels and multi-spectral voxel intensities. According to an advantageous implementation, the integrated objective function is expressed in Equation (9) above. This objective function can be optimized by using a well-known max-flow/min-cut algorithm for combinatorial optimization, as describe above. This results in a binary mask image that assigns each voxel in the multi-spectral MR image sequence a background label or a foreground label. Voxels labeled as foreground make up the brain tumor in the 3D MRI images. The resulting binary mask is overlaid with the multi-spectral 3D MRI images to segment the brain tumor, thus generating the segmented brain tumor image.

At step 210, the segmented brain tumor image can be post-processed to remove false positives. In particular, in order to remove small regions of false positive voxels, only the largest connected component in terms of pre-defined voxel neighborhoods of the graph cuts segmentation result can be retained as the final brain tumor segmentation result.

At step 212, the brain tumor segmentation results are output. For example, the brain tumor segmentation results can be output by displaying the brain tumor segmentation results on a display of a computer system, or other display device. It is also possible that the brain tumor segmentation results can be output by storing the segmentation results, for example, on a storage or memory of a computer system or on a computer readable medium.

Figure 3:
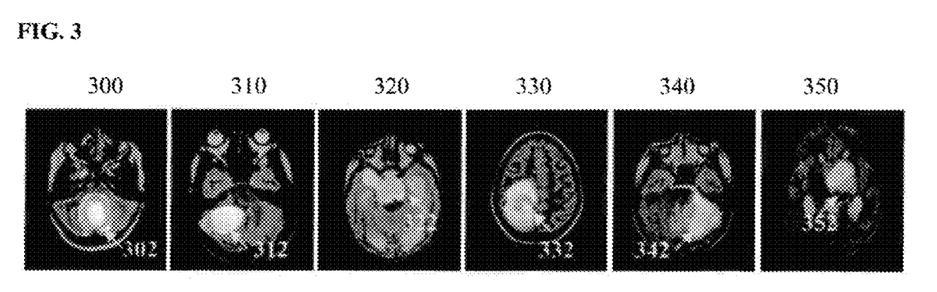
FIG. 3 illustrates exemplary pediatric brain tumor segmentation results segmented using the method of FIG. 2.

FIG. 3 illustrates exemplary pediatric brain tumor segmentation results segmented using the method of FIG. 2. As illustrated in FIG. 3, images 300, 310, 320, 330, 340, and 350 are axial slices of T2-weighted 3D MRI volumes, in which brain tumors 302, 312, 322, 332, 342, and 352, respectively, were detected using the method of FIG. 2. As shown in FIG. 3, the method of FIG. 2 can successfully segment challenging pediatric brain tumors.

Figure 4:
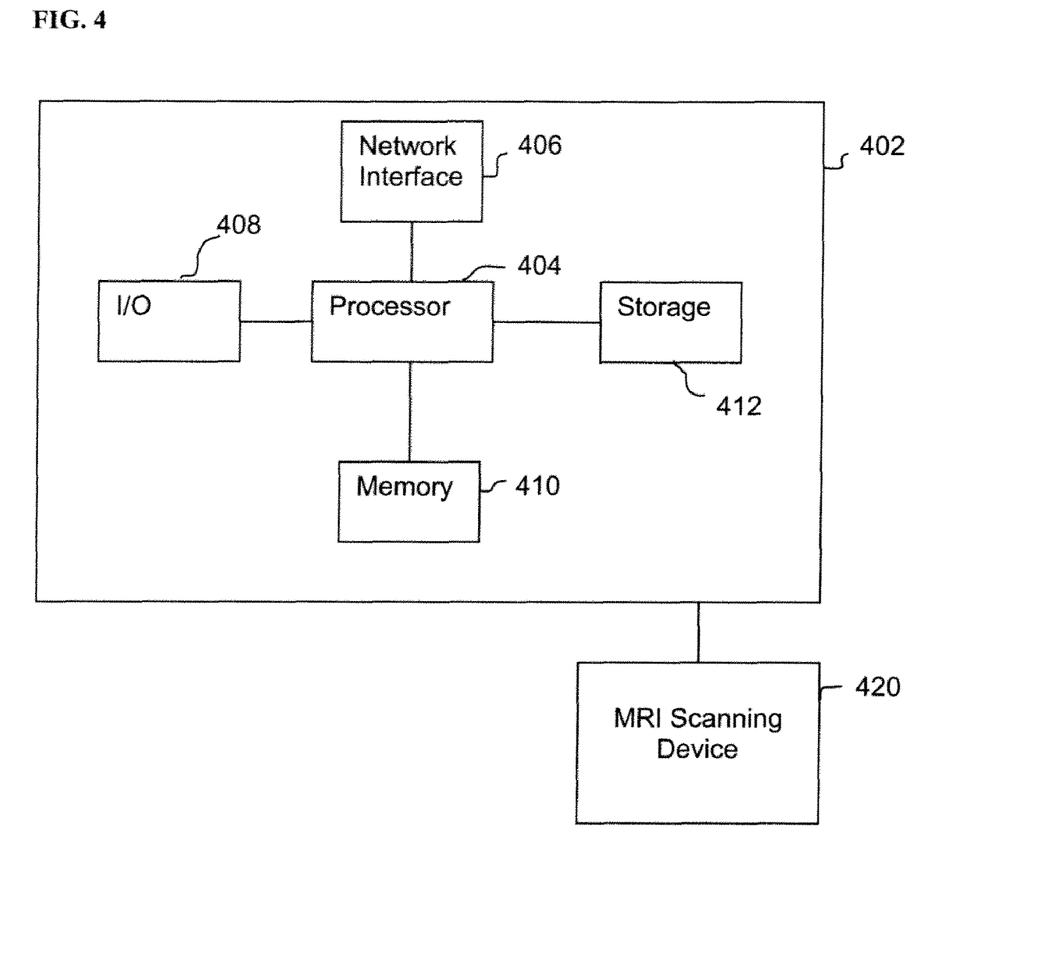
FIG. 4 is a high level block diagram of a computer capable of implementing the present invention.

The above-described methods for brain tumor segmentation in a multi-spectral 3D MRI image sequence may be implemented on a computer using well-known computer processors, memory units, storage devices, computer software, and other components. A high level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.) and loaded into memory 410 when execution of the computer program instructions is desired. Thus, the steps of the method of FIG. 2 may be defined by the computer program instructions stored in the memory 410 and/or storage 412 and controlled by the processor 404 executing the computer program instructions. An MR scanning device 420 can be connected to the computer 402 to input the multi-spectral MRI images to the computer 402. It is possible to implement the MR scanning device 420 and the computer 402 as one device. It is also possible that the MR scanning device 420 and the computer 402 communicate wirelessly through a network. The computer 402 also includes one or more network interfaces 406 for communicating with other devices via a network. The computer 402 also includes other input/output devices 408 that enable user interaction with the computer 402 (e.g., display, keyboard, mouse, speakers, buttons, etc.). One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for brain tumor segmentation in a multi-spectral 3D magnetic resonance (MR) image sequence comprising a plurality of voxels, comprising:
    determining, for each voxel in the multi-spectral 3D MR image sequence, a probability that the voxel is part of a brain tumor, using a trained probabilistic boosting tree (PBT) classifier; and
    generating a segmented brain tumor image using graph cuts segmentation based on the probabilities determined using the trained PBT classifier and intensities of the voxels in the multi-spectral 3D MR image sequence.

2. The method of claim 1, further comprising:
    pre-processing the multi-spectral 3D MR image prior to said determining step by:
        performing skull stripping to remove skull image data in order to extract the brain in 3D MR images;
        performing gradient anisotropic diffusion filtering; and
        performing inter-scan intensity standardization.

3. The method of claim 1, wherein said step of determining, for each voxel in the multi-spectral 3D MR image sequence, a probability that the voxel is part of a brain tumor, using a trained probabilistic boosting tree (PBT) classifier, comprises, for each voxel:
    calculating local features for the voxel in a neighborhood of the voxel; and
    determining the probability that the voxel is a brain tumor based on the local features calculated for the voxel.

4. The method of claim 3, wherein said local features comprise at least one of individual multi-spectral intensities, inter-spectrality intensity gradients, 2D Haar-like features calculated on an intra-axial 2D context surrounding a voxel, and 3D Haar-like features calculated on a 3D context surrounding a voxel.

5. The method of claim 1, wherein said step of generating a segmented brain tumor image using graph cuts segmentation based on the probabilities determined using the trained PBT classifier and intensities of the voxels in the multi-spectral 3D MR image sequence comprises:
    optimizing an objective function that integrates the probabilities determined using the trained PBT classifier and the intensities of the voxels in the multi-spectral 3D MR image sequence.

6. The method of claim 5, wherein the objective function comprises an observation model based on the probabilities determined using the trained PBT classifier and a spatial prior based on pair-wise homogeneity in classification labels and multi-spectral voxel intensities.

7. The method of claim 1, wherein said step of generating a segmented brain tumor image using graph cuts segmentation based on the probabilities determined using the trained PBT classifier and intensities of the voxels in the multi-spectral 3D MR image sequence comprises:
    constraining a graph cuts optimization based on the probabilities determined using the trained PBT classifier.

8. The method of claim 1, wherein said step of generating a segmented brain tumor image using graph cuts segmentation based on the probabilities determined using the trained PBT classifier and intensities of the voxels in the multi-spectral 3D MR image sequence comprises:
    generating a binary mask by optimizing an objective function based on the probabilities determined using the trained PBT classifier and intensities of the voxels in the multi-spectral 3D MR image sequence; and generating the segmented brain tumor image by overlaying the binary mask on a 3D MR image of the multi-spectral 3D MR image sequence.

9. The method of claim 1, further comprising:
removing false positive voxels from the segmented brain tumor image by retaining only a largest connected component of the segmented brain tumor image.

10. An apparatus for brain tumor segmentation in a multi-spectral 3D magnetic resonance (MR) image sequence comprising a plurality of voxels, comprising:
means for determining, for each voxel in the multi-spectral 3D MR image sequence, a probability that the voxel is part of a brain tumor, using a trained probabilistic boosting tree (PBT) classifier; and
means for generating a segmented brain tumor image using graph cuts segmentation based on the probabilities determined using the trained PBT classifier and intensities of the voxels in the multi-spectral 3D MR image sequence.

11. The apparatus of claim 10, wherein said means for determining, for each voxel in the multi-spectral 3D MR image sequence, a probability that the voxel is a part of brain tumor, using a trained probabilistic boosting tree (PBT) classifier, comprises:
means for calculating local features for a voxel in a neighborhood of the voxel; and
means for determining the probability that the voxel is a brain tumor based on the local features calculated for the voxel.

12. The apparatus of claim 11, wherein said local features comprise at least one of individual multi-spectral intensities, inter-spectrality intensity gradients, 2D Haar-like features calculated on an intra-axial 2D context surrounding a voxel, and 3D Haar-like features calculated on a 3D context surrounding a voxel.

13. The apparatus of claim 10, wherein said means for generating a segmented brain tumor image using graph cuts segmentation based on the probabilities determined using the trained PBT classifier and intensities of the voxels in the multi-spectral 3D MR image sequence comprises:
means for optimizing an objective function that integrates the probabilities determined using the trained PBT classifier and the intensities of the voxels in the multi-spectral 3D MR image sequence.

14. The apparatus of claim 13, wherein the objective function comprises an observation model based on the probabilities determined using the trained PBT classifier and a spatial prior based on pair-wise homogeneity in classification labels and multi-spectral voxel intensities.

15. The apparatus of claim 10, wherein said means for generating a segmented brain tumor image using graph cuts segmentation based on the probabilities determined using the trained PBT classifier and intensities of the voxels in the multi-spectral 3D MR image sequence comprises:
means for constraining a graph cuts optimization based on the probabilities determined using the trained PBT classifier.

16. The apparatus of claim 10, wherein said means for generating a segmented brain tumor image using graph cuts segmentation based on the probabilities determined using the trained PBT classifier and intensities of the voxels in the multi-spectral 3D MR image sequence comprises:
means for generating a binary mask by optimizing an objective function based on the probabilities determined using the trained PBT classifier and intensities of the voxels in the multi-spectral 3D MR image sequence; and
means for generating the segmented brain tumor image by overlaying the binary mask on a 3D MR image of the multi-spectral 3D MR image sequence.

17. A non-transitory computer readable medium encoded with computer executable instructions for brain tumor segmentation in a multi-spectral 3D magnetic resonance (MR) image sequence comprising a plurality of voxels, the computer executable instructions defining steps comprising:
determining, for each voxel in the multi-spectral 3D MR image sequence, a probability that the voxel is part of a brain tumor, using a trained probabilistic boosting tree (PBT) classifier; and
generating a segmented brain tumor image using graph cuts segmentation based on the probabilities determined using the trained PBT classifier and intensities of the voxels in the multi-spectral 3D MR image sequence.

18. The non-transitory computer readable medium of claim 17, wherein the computer executable instructions defining the step of determining, for each voxel in the multi-spectral 3D MR image sequence, a probability that the voxel is part of a brain tumor, using a trained probabilistic boosting tree (PBT) classifier, comprise computer executable instructions defining the steps of, for each voxel:
calculating local features for the voxel in a neighborhood of the voxel; and
determining the probability that the voxel is a brain tumor based on the local features calculated for the voxel.

19. The non-transitory computer readable medium of claim 18, wherein said local features comprise at least one of individual multi-spectral intensities, inter-spectrality intensity gradients, and 2D Haar-like features calculated on an intra-axial 2D context surrounding a voxel, and 3D Haar-like features calculated on a 3D context surrounding a voxel.

20. The non-transitory computer readable medium of claim 17, wherein the computer executable instructions defining the step of generating a segmented brain tumor image using graph cuts segmentation based on the probabilities determined using the trained PBT classifier and intensities of the voxels in the multi-spectral 3D MR image sequence comprises computer executable instructions defining the step of:
optimizing an objective function that integrates the probabilities determined using the trained PBT classifier and the intensities of the voxels in the multi-spectral 3D MR image sequence.

21. The non-transitory computer readable medium of claim 20, wherein the objective function comprises an observation model based on the probabilities determined using the trained PBT classifier and a spatial prior based on pair-wise homogeneity in classification labels and multi-spectral voxel intensities.

22. The non-transitory computer readable medium of claim 17, wherein the computer executable instructions defining the step of generating a segmented brain tumor image using graph cuts segmentation based on the probabilities determined using the trained PBT classifier and intensities of the voxels in the multi-spectral 3D MR image sequence comprises computer executable instructions defining the step of:

constraining a graph cuts optimization based on the probabilities determined using the trained PBT classifier.

23. The non-transitory computer readable medium of claim 17, wherein the computer executable instructions defining the step of generating a segmented brain tumor image using graph cuts segmentation based on the probabilities determined using the trained PBT classifier and intensities of the voxels in the multi-spectral 3D MR image sequence comprises computer executable instructions defining the steps of:

generating a binary mask by optimizing an objective function based on the probabilities determined using the trained PBT classifier and intensities of the voxels in the multi-spectral 3D MR image sequence; and generating the segmented brain tumor image by overlaying the binary mask on a 3D MR image of the multi-spectral 3D MR image sequence.

* * * * *